UNITED STATES PATENT OFFICE.

GEORGE D. HORTON, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF PRODUCING BUTYL ALCOHOL AND ACETONE BY FERMENTATION.

1,427,595.     Specification of Letters Patent.     Patented Aug. 29, 1922.

No Drawing.     Application filed September 6, 1919. Serial No. 322,186.

*To all whom it may concern:*

Be it known that I, GEORGE D. HORTON, a citizen of the United States, and a resident of Wilmington, in the county of New Castle and State of Delaware, have invented a certain new and useful Process for Producing Butyl Alcohol and Acetone by Fermentation, of which the following is a specification.

This invention relates to a process of producing butyl alcohol and acetone by fermentation, and, more particularly, a process of this kind in which the fermentation is brought about by a heretofore unisolated bacteria which I have named *Bacillus acetobutylicum*.

The joint production of butyl alcohol and acetone by fermentation, thus broadly stated, is old, but the processes hitherto proposed have had certain disadvantages which have rendered difficult their practice on a commercial scale. Thus considerable difficulty is encountered in the isolation and maintenance of pure active cultures of the particular species of bacteria heretofore used in fermentations of this kind, and in cases where this species was anaerobic both the apparatus and the process were complicated by the necessity of excluding air and, in some cases, of working under reduced pressure.

One of the objects of my invention is to provide a butyl alcohol-acetone fermentation process wherein the bacteria to be used may be readily isolated and kept in a condition capable of causing active butyl alcohol and acetone fermentation when transplanted into a suitable mash. Another object of my invention is to provide a process of this character wherein the bacteria used are capable of causing vigorous fermentation of carbohydrates with good yields of butyl alcohol and acetone in the presence of air, thus avoiding the great disadvantages entailed when working with anaerobic bacteria.

The bacteria which I prefer to use, and which possess the desirable characteristics above mentioned, have been named by me *Bacillus aceto-butylicum;* the manner of isolating this species of bacteria will be hereinafter described, but in order to facilitate their identification the species is described at this point in accordance with the descriptive chart of the Society of American Bacteriologists:—

Source—corn meal.
Name—*Bacillus aceto-butylicum.*

*I. Morphology.*

1. Vegetable cells, motile:
Media used—nutrient agar slant containing 1% corn starch, or 5% corn media (1 part corn meal in 20 parts water), temp. 32° C., age 24 hours.
Form—short rods, chain formation.
Size—2–4 microns x 1–2 microns.
Ends—rounded.
Stain—evenly with Loeffler's methylene blue or gentian violet.
Gram stain positive.

2. Sporangia:
Media used—nutrient agar slant containing 1% corn starch, temperature 32° C., after 2 days spores formed.
Form—oval. Spores central.
Limits of size—1.6 microns x 1.2 microns.
Size of majority—1.6 microns x 1.2 microns.
Spores stain poorly with Loeffler's methylene blue.

*II. Cultural features.*

1. Nutrient agar slant media, age 24 hours, temp. 32° C.
Growth—abundant.
Form of growth—echinulate.
Elevation of growth—raised.
Luster—dull.
Optical character—opaque.
Topography—smooth.
Odor—absent.
Consistency—viscid.
Media—clear.

2. Potato, 24 hours, 32° C.
Growth—abundant.
Form of growth—spreading.
Elevation of growth—raised.
Luster—dull.
Topography—rugose.
Color—white turning to brown.
Odor—pleasant, Gas formation.
6. Nutrient broth.
Surface growth—none.
Clouding—moderate.
Odor—none.
Sediment—slight.
7. Milk.
Coagulation prompt, with gas evolution.
Clot digested.
8. Litmus milk.
Acid, gas evolution, clot digestion.
10. Agar colonies, 24 hours, 32° C.
Growth—rapid.
Round—becoming irregular.
Surface—smooth.
Elevation—raised.
Edge—entire.
Internal structure—amorphous.
11. Starch agar (1% corn starch in nutrient agar).
Growth—abundant.
Diastatic action—marked.
17. Nitrogen source.
Proteins, peptone.

*III. Physical and biochemical features.*

1. Fermentation tubes.
Substances fermented with gas evolution.
Dextrose +
Saccharose +
Lactose +
Maltose +
Glycerine —
Starch +
Galactose +
Corn +
Dextrine +
7. Optimum reaction of media:
For growth and fermentation, Sorensen's $^PH$ values—5.0–6.3
8. Vitality on culture media.
Several months at 32° C.
9. Temperature relation.
Optimum temperature 32° to 36° C.
Spores resist 80° C. for 20 minutes.
10. Resistant to drying.
13. Acids produced, butyric.
15. Alcohol, butyl.
Ketone, acetone.

*Isolation of the organism.*

After a careful investigation of the subject, the procedure adopted for isolating the *Bacillus aceto-butylicum* was as follows:—

Test tubes of corn meal solution are prepared, heated to 80° C. for about twenty minutes to kill the less resistant bacteria, incubated at 32° C. without removing the air and then watched closely for evidence of butyl alcohol fermentation. The culture in the tube or tubes which show an active fermentation in the presence of air and yield a characteristic butyl alcohol odor, are in part transferred to a solid agar culture plate and the bacteria allowed to develop in colonies on its surface. Transfers are made from these colonies to fresh sterilized corn meal tubes and the type noted which produced the characteristic fermentation. This operation is repeated several times until agar plates are obtained which contain only the colonies of the desired type. Transfers are made to sterilized potato slabs from colonies which developed from a single organism and the bacillus is then retained in pure culture on sterilized potato by frequent transfers.

*Example of specific operation with corn meal and other grains.*

In order to produce a large fermentation with this organism I proceed as follows: A platinum loop of bacteria is scraped from the surface of a potato culture and dropped into a test tube containing 10 cc. of a sterilized 5% corn meal solution. After incubation at 32° C. for about 46 hours the solution is added to 100 cc. of sterilized 2% corn meal solution, incubated at 32° C. for about 24 hours and transferred into 1000 cc. of sterilized 2% corn meal solution and incubated about twenty hours at 32° C. The entire culture is then added to the major mash composed of twenty liters of sterilized 5% corn meal solution: the fermentation begins at once and is complete in from about 48 to 52 hours. The temperature may with advantage be kept anywhere from 30 to 40° C., but is preferably held between 32–36° C. During the fermentation there occurs a copious evolution of gas which continues to the end. The odor of butyl alcohol and acetone gradually increases during the fermentation. A copious evolution of gas indicates that the mash is undergoing active fermentation.

During these operations extreme care should be observed to prevent outside contamination. The small culture flasks may be of glass with cotton plugs, and the final fermenter of enamel-lined iron, and kept covered with, for instance, a tin cover. Wooden tubs fitted with tin covers have been used successfully for the final fermentations. Corn meal solutions are somewhat difficult to sterilize and blank tests for fermentation should be made from time to time on the sterilized material. Under usual conditions I have found two hours at 15 pounds steam pressure sufficient to insure complete sterilization of the corn meal.

The corn meal procedure applies also to barley, rice, and other grains. I have found that the fermentation of a 5% corn meal solution usually gives at least 18% by weight of mixed butyl alcohol and acetone on the basis of the weight of the commercial corn meal used, or considering the corn meal to average 60% starch, 30% by weight of mixed products on the basis of the weight of the starch. There is but little difficulty in carrying out the operations with corn meal and the yields are uniformly high. There has been no advantage in using concentrations of over 5% corn meal because the products of the fermentation inhibit and destroy further action of the organism after this amount of material has been utilized.

The recovery of butyl alcohol and acetone may be conveniently carried out as follows:—The fermented liquid is distilled in an iron still fitted with a steam coil. At 60° C. acetone starts coming over into the receiver and as the temperature rises to 91° C. the distillate becomes cloudy due to the butyl alcohol and water coming over at that temperature as a constant boiling mixture. The temperature is carried to 100° C. to remove all the mixed products. The constant boiling mixture of butyl alcohol and water is found to be composed of 43% water and 57% butyl alcohol. This cannot be fractioned by distillation, but the greater part of the butyl alcohol which separates as a clear layer is separated mechanically. The butyl alcohol in the water is removed by redistillation. The acetone and butyl alcohol are finally obtained by fractionation in a small glass still fitted with a Hempel column. The proportion of butyl alcohol to acetone in yields from corn I have found to be about 2.14 to 1.

As stated above, the bacteria which I have named *Bacillus aceto-butylicum* is capable of fermenting starch materials such as corn meal in the presence of air with a high yield of butyl alcohol and acetone. The same fermentation, at least in so far as the production of butyl alcohol and acetone is concerned, is brought about in the absence of air. Consequently no effort need be made to insure the presence of air during the fermentation. The air is ordinarily excluded to a great extent by the evolution of gas from the fermenting mass, and of course air laden with bacteria is carefully excluded to prevent contamination. The advantage, however, in working with facultative anaerobes such as the *Bacillus aceto-butylicum*, that is, bacteria which live or ferment in either the presence or absence of air, is that it is frequently more convenient to avoid contamination by filtering the air than by excluding it entirely.

I have described in considerable detail the species of bacteria, *Bacillus aceto-butylicum*, which I believe I am the first to isolate, and my invention includes broadly the fermentation of starchy materials by the single action of this bacteria. On the other hand, it may be that the cultures which are first obtained after killing undesirable bacteria by heating to 80° C. for twenty minutes, and which are able to produce butyl alcohol and acetone by fermentation in the presence of air, contain various bacteria in addition to *Bacillus aceto-butylicum*, which either assist the latter in the production of butyl alcohol, or at least do not seriously interfere with its activity in this direction. Consequently my invention, from another aspect, includes the fermentation of starchy materials, such as a sterilized grain mash, with a culture of bacteria derivable from corn meal and able to withstand the above mentioned heat treatment, and capable of fermenting, in the presence of air, a corn meal solution with a substantial yield of butyl alcohol and acetone, irrespective of whether the bacteria of said culture are composed wholly or only partly of *Bacillus aceto-butylicum*.

Summing up the advantages of my process, the seeding cultures are easily derived and maintained in active condition, the necessity of working in the absence of oxygen is avoided, the starchy substances, such as corn meal, which may be used as the fermentable material, are inexpensive, and the yields regularly obtained (30% based on the weight of the starch) are considerably higher than those reported in the prior art.

I claim:—

1. The process which comprises adding to a sterilized grain mash a culture of bacteria which are derivable from ordinary corn meal, are sufficiently heat resistant to withstand a temperature of 80° C. for about twenty minutes, and are capable of producing butyl alcohol and acetone by fermentation in the presence of air of a sterilized corn meal solution, and maintaining the thus treated mash at a temperature between 30 and 40° C. to bring about active fermentation thereof.

2. The process which comprises adding to a sterilized corn meal mash a culture of bacteria which are derivable from ordinary corn meal, are sufficiently heat resistant to withstand a temperature of 80° C. for about twenty minutes, and are capable of producing butyl alcohol and acetone by fermentation in the presence of air of a sterilized corn meal solution, and maintaining the thus treated mash at a temperature between 30 and 40° C. to bring about active fermentation thereof.

3. The process which comprises adding to a sterilized grain mash a culture of bacteria which are derivable from ordinary corn meal, are sufficiently heat resistant to withstand a temperature of 80° C. for about twenty minutes, and are capable of producing butyl alcohol and acetone by fermentation, in the presence of air, of a sterilized corn meal solution, and maintaining the thus treated mash at a temperature of from about 32 to 36° C. until the fermentation is about completed as indicated by the cessation of evolution of gas.

4. The process which comprises adding to a sterilized corn meal mash a culture of bacteria which are derivable from ordinary corn meal, are sufficiently heat resistant to withstand a temperature of 80° C. for about twenty minutes, and are capable of producing butyl alcohol and acetone by fermentation, in the presence of air, of a sterilized corn meal solution, and maintaining the thus treated mash at a temperature of from about 32 to 36° C. until the fermentation is about completed as indicated by the cessation of evolution of gas.

5. The process which comprises adding a culture of the hereinbefore described *Bacillus aceto-butylicum* to a sterilized grain mash, and maintaining the treated mash at a temperature sufficient to bring about active fermentation.

6. The process which comprises adding a culture of the hereinbefore described *Bacillus aceto-butylicum* to a sterilized corn meal mash, and maintaining the treated mash at a temperature sufficient to bring about active fermentation.

7. The process which comprises adding a culture of the hereinbefore described *Bacillus aceto-butylicum* to a sterilized grain mash, and maintaining the treated mash at a temperature of from about 32 to 36° C. until fermentation is about completed as indicated by the cessation of evolution of gas.

8. The process which comprises adding a culture of the hereinbefore described *Bacillus aceto-butylicum* to a sterilized corn meal mash, and maintaining the treated mash at a temperature of from about 32 to 36° C. until fermentation is about completed as indicated by the cessation of evolution of gas.

9. The process which comprises adding a culture of the hereinbefore described *Bacillus aceto-butylicum* to a sterilized solution containing about 5% of corn meal, and maintaining the treated mash at a temperature sufficient to bring about active fermentation.

10. The process which comprises adding a culture of the hereinbefore described *Bacillus aceto-butylicum* to a sterilized grain mash, maintaining the treated mash at a temperature sufficient to bring about active fermentation, and recovering from the fermented mash butyl alcohol and acetone which has been formed therein.

11. The process which comprises adding a culture of the hereinbefore described *Bacillus aceto-butylicum* to a sterilized corn meal mash, maintaining the treated mash at a temperature sufficient to bring about active fermentation, and recovering from the fermented mash butyl alcohol and acetone which has been formed therein.

12. The process which comprises preparing a fluid culture of the hereinbefore described *Bacillus aceto-butylicum* in a sterilized solution containing about 2% of corn meal, adding said culture to about twenty times its volume of a sterilized solution containing about 5% of corn meal and constituting the major mash, and maintaining the resulting mixture at a temperature of from about 32 to 36° C. until fermentation is substantially completed.

13. The process which comprises adding a culture of the hereinbefore described *Bacillus aceto-butylicum* to a sterilized grain mash, and maintaining the treated mash at a temperature sufficient to bring about active fermentation without positively excluding sterilized air from said mash.

14. The process which comprises causing the hereinbefore described *Bacillus aceto-butylicum* to ferment a sterilized 5% corn meal solution, and recovering the butyl alcohol and acetone which are formed during the fermentation.

15. In the process of producing butyl alcohol and acetone by fermentation, the steps of preparing suitable cultures which comprise heating a plurality of samples of corn meal mixed with water to a temperature of about 80° C. for about twenty minutes, incubating said samples at about 32° C. without removing the air, inoculating a solid culture medium with a portion of such one of said samples as has undergone butyl alcohol fermentation, allowing the bacteria thus transplanted to develop in colonies on the surface of said solid culture medium, transferring bacteria from at least some of said colonies, respectively, to fresh samples of sterilized corn meal solution, and repeating the transfers of bacteria, with respect to samples which show butyl alcohol fermentation, from corn meal culture to solid culture and back again to corn meal until colonies are obtained of a uniform type capable of yielding butyl alcohol and acetone by fermentation of corn meal solutions, then inoculating a sterilized solution containing a small percentage of corn meal and incubating the culture at a temperature of about 32° C. to induce therein a vigorous growth of the bacteria.

16. The process of producing acetone and butyl alcohol which comprises fermenting a sterilized grain mash with the hereinbefore described *Bacillus aceto-butylicum*.

17. The process of producing acetone and butyl alcohol which comprises fermenting a sterilized corn meal mash with the hereinbefore described *Bacillus aceto-butylicum*.

18. The process of producing acetone and butyl alcohol which comprises fermenting a sterilized solution containing about 5% of corn meal with the hereinbefore described *Bacillus aceto-butylicum*.

19. The process which comprises fermenting a sterilized grain mash with the hereinbefore described *Bacillus aceto-butylicum*, and recovering from the fermented mash butyl alcohol and acetone which have been formed therein.

20. The process which comprises fermenting a sterilized corn meal mash with the hereinbefore described *Bacillus aceto-butylicum*, and recovering from the fermented mash butyl alcohol and acetone which have been formed therein.

21. The process of producing acetone and butyl alcohol which comprises fermenting a sterilized grain mash with the hereinbefore described *Bacillus aceto-butylicum* without positively excluding sterilized air from said mash.

In testimony whereof I affix my signature.

GEORGE D. HORTON.